(12) United States Patent
Fetterly

(10) Patent No.: US 7,378,626 B2
(45) Date of Patent: May 27, 2008

(54) DIRECTED INFRARED COUNTERMEASURES (DIRCM) SYSTEM AND METHOD

(75) Inventor: Donald R. Fetterly, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 314 days.

(21) Appl. No.: 11/242,967

(22) Filed: Oct. 4, 2005

(65) Prior Publication Data
US 2007/0075182 A1    Apr. 5, 2007

(51) Int. Cl.
*H04K 3/00* (2006.01)
*G01S 7/495* (2006.01)
*F41G 7/00* (2006.01)
*F42B 15/00* (2006.01)

(52) U.S. Cl. ............... 244/3.1; 244/1 R; 455/1; 342/13; 342/14; 398/39; 89/1.11

(58) Field of Classification Search .......... 244/3.1–3.3, 244/1 R; 342/13–20, 52–56, 59, 61–67, 342/175, 195; 455/1; 398/39; 250/493.1, 250/503.1, 504 R, 330; 89/1.11, 1.816; 356/140, 356/141.1
See application file for complete search history.

(56) References Cited

U.S. PATENT DOCUMENTS

| | | | | |
|---|---|---|---|---|
| 3,427,611 A | * | 2/1969 | Enenstein | 342/54 |
| 3,992,708 A | * | 11/1976 | Olson et al. | 342/52 |
| 4,112,300 A | * | 9/1978 | Hall et al. | 250/300 |
| 5,198,607 A | * | 3/1993 | Livingston et al. | 89/1.11 |
| 5,600,434 A | * | 2/1997 | Warm et al. | 89/1.11 |
| 5,662,291 A | * | 9/1997 | Sepp et al. | 244/3.13 |
| 5,703,314 A | * | 12/1997 | Meeker | 89/1.11 |
| 5,918,305 A | * | 6/1999 | Livingston | 89/1.11 |
| 6,014,922 A | * | 1/2000 | Livingston | 89/1.11 |
| 6,021,975 A | * | 2/2000 | Livingston | 244/3.11 |
| 6,267,039 B1 | * | 7/2001 | Czarnecki | 89/1.11 |
| 6,359,710 B1 | * | 3/2002 | Takken et al. | 244/3.16 |
| 6,396,577 B1 | * | 5/2002 | Ramstack | 356/141.1 |
| 6,429,446 B1 | * | 8/2002 | Labaugh | 250/504 R |
| 7,017,467 B1 | * | 3/2006 | Monroe | 89/1.816 |
| 7,046,187 B2 | * | 5/2006 | Fullerton et al. | 324/54 |

* cited by examiner

*Primary Examiner*—Bernarr E. Gregory
(74) *Attorney, Agent, or Firm*—Noblitt & Gilmore, LLP

(57) ABSTRACT

An agile, high-power, reliable DIRCM system that is easily extended to address sophisticated UV or UV-visible capable multi-band threats includes a missile warner having missile warning receivers (MWRs), one or two-color suitably in the mid-IR range, that detect likely missile launch and pass the threat coordinates to a pointer-tracker having a Roll/Nod gimbal on which the IR laser transmitter is mounted. The pointer-tracker slews the gimbal to initiate tracking based on the threat coordinates and then uses its detector to continue to track and verify the threat. If the threat is verified, the pointer-tracker engages the laser to fire and jam the missile's IR seeker. By slewing the gimbal based on unverified threat coordinates to initiate tracking the system is highly agile and can respond to short and near simultaneous MANPADS shots.

22 Claims, 7 Drawing Sheets

DIRECTED INFRARED COUNTERMEASURES (DIRCM) SYSTEM AND METHOD

BACKGROUND OF THE INVENTION

1. Field of the Invention

This invention relates to directed infrared countermeasure (DIRCM) systems, and more particularly to a DIRCM system for use with commercial aircraft to effectively counter MANPADS and more advanced threats.

2. Description of the Related Art

The proliferation of shoulder-launched missiles known as MANPADS for "Man-Portable Air-Defense System" and their availability to terrorists present a real threat to military aircraft and particularly commercial aircraft. Estimates of the number of attacks on commercial aircraft vary, running as high as 43 hits on civilian aircraft—with 30 of these resulting in aircraft kills and the loss of nearly 1,000 lives—since the 1970s. More than half a million MANPADS have been delivered worldwide, and many of these are still operational. These missiles currently use infrared (IR) seekers to track and lock-on to the aircraft. The missiles typically have a range of 5-8 km and can reach an altitude of approximately 12,000 ft. Historically, countermeasures range from active IR jamming to flares and chaff.

As illustrated in FIGS. 1 and 2, a terrorist 10 holds a MANPADS 12 on his or her shoulder, points it at the aircraft 14 and launches the missile 16. A typical missile 16 will typically progress through the eject, boost, sustain and possibly post-burn stages before impacting the aircraft. The missile's IR seeker 18 tracks IR energy emitted by the aircraft 14. The seeker processes the infrared scene containing the target and generates target tracking information 22 that guides the missile 16 enabling the seeker to track hot targets like aircraft 14. The aircraft's DIRCM system 24, suitably mounted in a "blister pack" near the rear of the aircraft, must detect, verify, track and then emit a modulated laser beam 26 or eject flares that produce a false signature 28 to jam the missile's IR seeker. The purpose of either approach is to generate a false target with a "miss distance" from the aircraft. The DIRCM system will typically try to detect the missile at ejection based on the eject motor's impulse signature, verify the threat and track the heat plume 30. The DIRCM system is particularly stressed when the shot is taken from close range such as might be the case on take-off or landing or when multiple simultaneous shots are taken at the aircraft, this later case being taught to terrorists undergoing formal training.

An effective DIRCM system must be able to detect and verify the threat and jam the IR seeker with low false-alarm rates during burn and post burn out of the missile's flight motor. False alarms should occur no more than once every 100 take-offs or landings, or 17 hours of operation, whichever is the lower. To be effective against short-range shots and multiple closely timed shots, the DIRCM system must be able to respond very quickly, less than 1-2 seconds, to engage and neutralize the threat. The system should have a probability of success of at least 90% against multiple MANPADS launches, or 80%-plus against two missiles with simultaneous impact times. The DIRCM system should have the capability to extend to more sophisticated threats from missiles outfitted with both IR and UV seekers.

DIRCM systems for use in commercial aviation must satisfy a number of other criteria without sacrificing effectiveness. The cost of any system must be affordable including the unit, certification, installation, operation and maintenance. The system technology must be exportable. The system should present minimal additional aerodynamic drag, be light weight and have a relatively low power budget to avoid increasing fuel costs. The system should be capable of transmitting the modulated laser beam at high power levels in order to effectively jam the missile from maintaining lock on the large cross-sections of commercial aircraft. Furthermore, the system should have no negative psychological impact on the flying public and post no threat to the environment, passengers or flight crew.

Northrop Grumman's Large Aircraft Infrared Countermeasures (LAIRCM) uses AN/AAR-54(V) Missile Warning System (MWS) sensors, operating at ultraviolet wavelengths to detect the weapon's exhaust plume, to provide initial alerting. Each sensor covers a 120° field of view and has a high resolution to discriminate threats from clutter. The MWS supplies its measurements to the system processor, which evaluates the signals and—if they are determined to represent a hostile missile—declares the target as a threat. In response, the "gimbal" or "jam head" containing the fine-track sensor (FTS) and jammer slews to the appropriate direction. The FTS locks on to and tracks the threat, and continuously slews the gimbal so that it remains pointed at the incoming missile. The transmitter then employs a modulated beam of infrared energy to jam the weapon's guidance signal. This entire process typically takes 1-2 seconds for the easiest cases of close and mid range shots where the launch motor impulse is detected and boost sustain motor signature is highest. This time increases when the launch pulse is weak or masked or the motor has burned out. See "David versus Goliath", International Defense Review, Apr. 1, 2004, Mark Hewish and Joris Janssen Lok.

The LAIRCM is built on the same platform as its predecessor Nemesis but uses a laser instead of a flashlamp. As a result the FTS is very heavy and does not respond quickly. Therefore the LAIRCM and other similar systems must verify the threat before slewing the gimbal to initiate tracking. The LAIRCM uses free-space optics to optically couple the laser output to the gimbal. The optical path has very high losses, which reduces the output power of the modulated laser. Furthermore, the air-glass interfaces of the free-space components are highly susceptible to contamination and damage, which reduces the reliability of the system. In addition, the LAIRCM can not support an additional UV laser in the same gimbal to counter more advanced threats because the internal optics and transmit ports do not transmit UV. Furthermore, LAIRCM is very expensive, contains classified technology, is very heavy, consumes a lot of power and was not designed with high production rates in mind. Production rates are far below those requested in the commercial arena and no war surge capacity is known to exist.

BAE Systems has demonstrated a DIRCM system that is similar to the LAIRCM except that it uses optical fiber to couple the laser to the gimbal (BAE Systems, Nashua N.H. IRIS Paper 2001CMC02x Infrared-Transmitting Fibers for Advanced IRCM Systems Demonstrations May 2001). The implementation of an "All-Fiber Path" was intended to improve output power and reliability. However, to achieve the necessary gimbal dual-axis rotation, three discrete fiber segments are coupled to each other using custom-made fiber optic rotary joints, which are capable of 360° rotation. The two short sections of fiber cable used inside the head are of larger core diameters equal to 200 and 250 µm, respectively, to prevent potential loss due to rotation misalignment of the joints.

Using multiple fiber segments inside the gimbal resulted in the elimination of several actuated mirrors and servo loops which reduces complexity and could potentially enhance system reliability. However, piping the fiber through the two gimbal axes (Roll and Nod) mandated the use of non-continuous fiber segments coupled optically with optical rotary joints. The optical rotary joints have insertion and extraction losses at each interface between the fibers on the input and output, optical elements (input and output face) and at each air gap (minimum of three air spaces and six AR coatings per rotary joint). Each air gap is subject to contamination and as experienced during the demonstration damage to the AR coatings.

In the demonstration by BAE approximately 3.3 W of laser power was used in the 3-5 µm wavelength region. It was found that even at the modest power levels used in the BAE demonstration the high peak optical power from the laser caused damage to the AR coatings; however, the fibers were undamaged and continued to transmit the laser power. The rotary joints also introduce additional loading on the gimbal torquers resulting in reduced slew rates and increased settling times adversely impacting system performance in multiple short shot engagements. The rotary joint limits any attempt to significantly downsize the gimbal to reduce aerodynamic drag due to mechanical limitations inherent in the design of the rotary joint, fiber fittings and fiber protective sheathing which limit fiber bend radius on each side of he fiber optic rotary joint.

Similar to the LAIRCM system, the BAE system must first detect and verify the threat before slewing the tracker to initiate tracking. The use of the segmented fibers and optic rotary joint eliminates some free-space components but still suffers from losses and damage associated with free-space optics. The use of optic rotary joints would, at a minimum, make it very difficult to incorporate a UV fiber and transmitter in the same gimbal.

Most of the available DIRCM systems use 1-color MWS to detect and verify the threat and 1-color pointer-trackers to track the threat once verified. To improve tracking capability some systems, e.g. TADIRCM Development Program PMA-272, use 2-color pointer-trackers where 2-color simply refers to two separate bands in the mid-IR. To improve the detection range and reduce the false-alarm rate, system providers are developing 2-color MWS.

Because these DIRCM systems are all variants of mechanical and algorithmic platforms initially built to counter surface-to-air and air-to-air missiles launched against military aircraft using flashlamps and not lasers they do not adequately address the threat posed by MANPADS to military and particular commercial aircraft. DIRCM systems with faster response times, higher power and greater reliability are needed. These systems should also be capable of incorporating a UV/Visible laser in the same gimbal to counter currently fielded 4th generation threats like Stinger RMP and those in development like the system described in Patent RU 2160453 C2 Leningrad Optical-Mechanical Company (LOMO), Optical-Electronic Seeker. The system must be low-cost, exportable and highly effective.

SUMMARY OF THE INVENTION

The present invention provides an agile, high-power, reliable DIRCM system that is easily extended to address sophisticated UV or UV-visible capable multi-band threats.

This is accomplished with a missile warner including missile warning receivers (MWRs), one or two-color suitably in the mid-IR range, that detect likely missile launch (es) and pass the threat coordinates to a pointer-tracker having a Roll/Nod gimbal on which the IR laser transmitter is mounted. The pointer-tracker slews the gimbal to initiate tracking based on the threat coordinates and then uses its detector to continue to track and verify the threat. If the threat is verified, the pointer-tracker engages the laser to fire and jam the missile's IR seeker. By stewing the gimbal based on unverified threat coordinates to initiate tracking the system is highly agile and can respond to short and near simultaneous MANPADS shots.

In an embodiment, the pointer-tracker uses a two-color detector to track and verify the threat thereby reducing false alarm rates to levels acceptable for commercial aviation and increasing the effective detection range.

In another embodiment, a continuous fiber path is used to couple the output of the laser to the input of the laser transmitter mounted on the gimbal. The continuous fiber path greatly reduces loss and possibility of damage associated with free-space optical interfaces, and thus greatly increases output power and reliability.

In another embodiment, the continuous fiber path is routed around the gimbal pivot and off the Roll/Nod gimbal axes. Consequently, a second continuous fiber can be routed along the fiber path to couple a UV/visible laser, e.g. UV or short IR bands, to a laser transmitter mounted on the gimbal. The laser transmitter may be shared with the IR laser or separate depending on the optical design. The gimbal dome is substantially transparent to both IR and UV to short IR light.

In another embodiment, the laser transmitter(s) is mounted off-axis from the Roll/Nod gimbal axes to avoid backscatter from the laser into the pointer-tracker's detector. Conformal optics is used to minimize the distortion through the gimbal's spherical dome caused by the off-axis mounting.

These and other features and advantages of the invention will be apparent to those skilled in the art from the following detailed description of preferred embodiments, taken together with the accompanying drawings, in which:

DETAILED DESCRIPTION OF THE INVENTION

The present invention provides an agile, high-power, reliable DIRCM system that is easily extended to address sophisticated UV/visible/IR multiple band threats. Agility and more specifically the capability to respond very quickly to detect, track and engage threats is a product of a light-weight pointer-tracker that can be moved quickly, a control process that initiates slewing of the gimbal based on detected but unverified threat coordinates and a two-color tracking and verification algorithm. The use of a two-color pointer-tracker improves detection range and reduces the false-alarm rate. Power and reliability is a product of a continuous fiber path from the laser, around the Roll/Nod axes and to the laser transmitter. There are no air-glass interfaces to induce loss or to become contaminated or damaged. Lastly, because the fiber path is routed around the Roll/Nod gimbal axes, a second fiber can be routed along the same path to bring a UV/visible laser, e.g. UV to short IR bands, to the laser transmitter.

Figure 1:
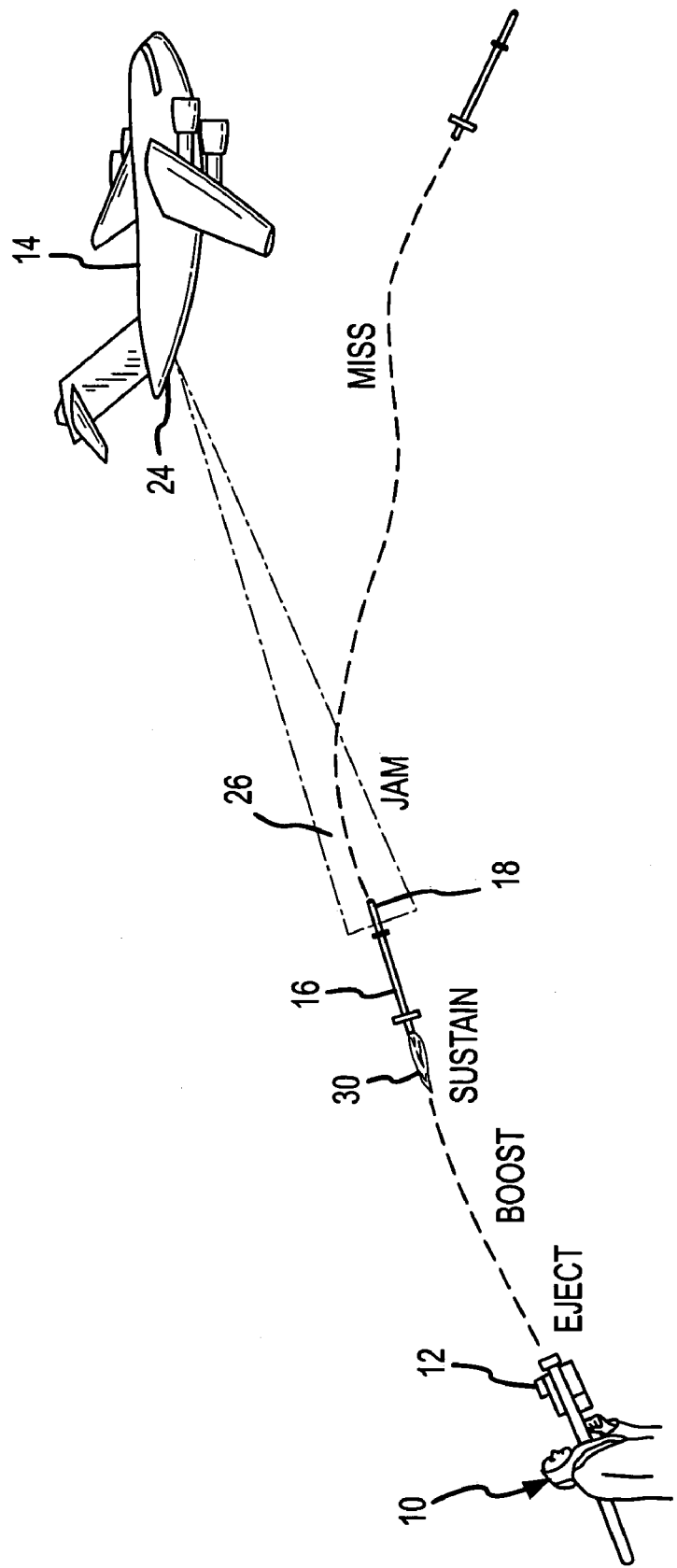
FIG. 1, as described above, is a diagram of a MANPAD missile launch and effective jamming by a DIRCM on an aircraft.
Figure 2:
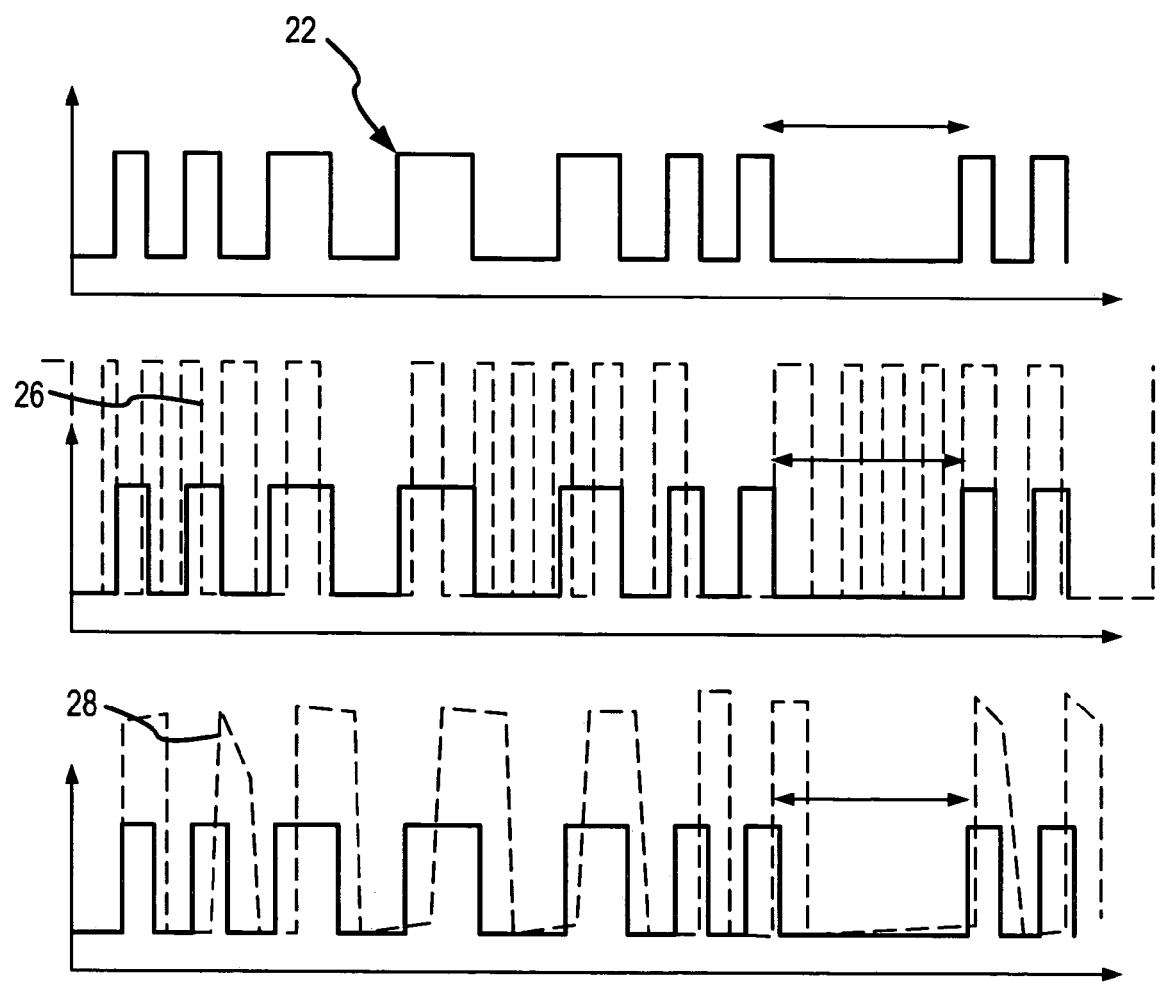
FIG. 2, as described above, illustrates the principles of jamming.
Figure 3:
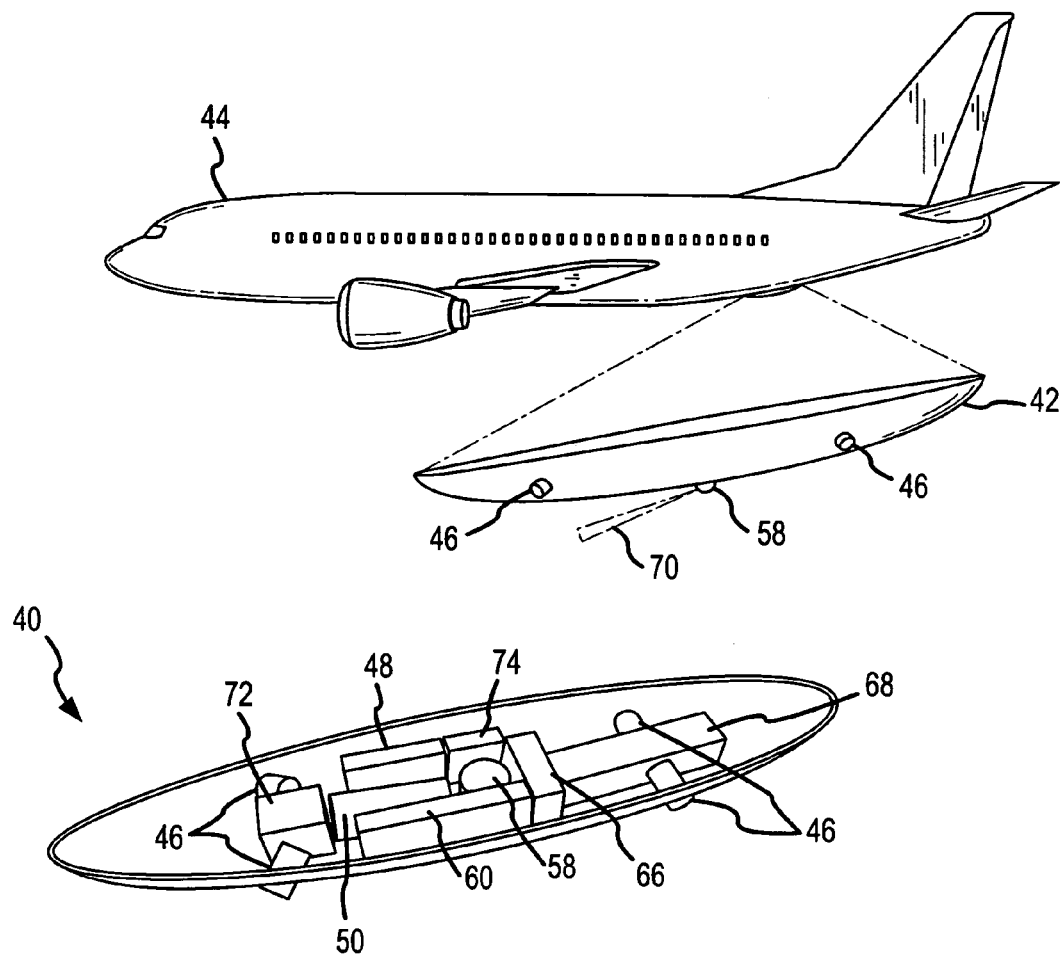
FIG. 3 is a simplified diagram of a blister pack for a DIRCM system in accordance with the present invention mounted near the tail of the aircraft.
Figure 4:
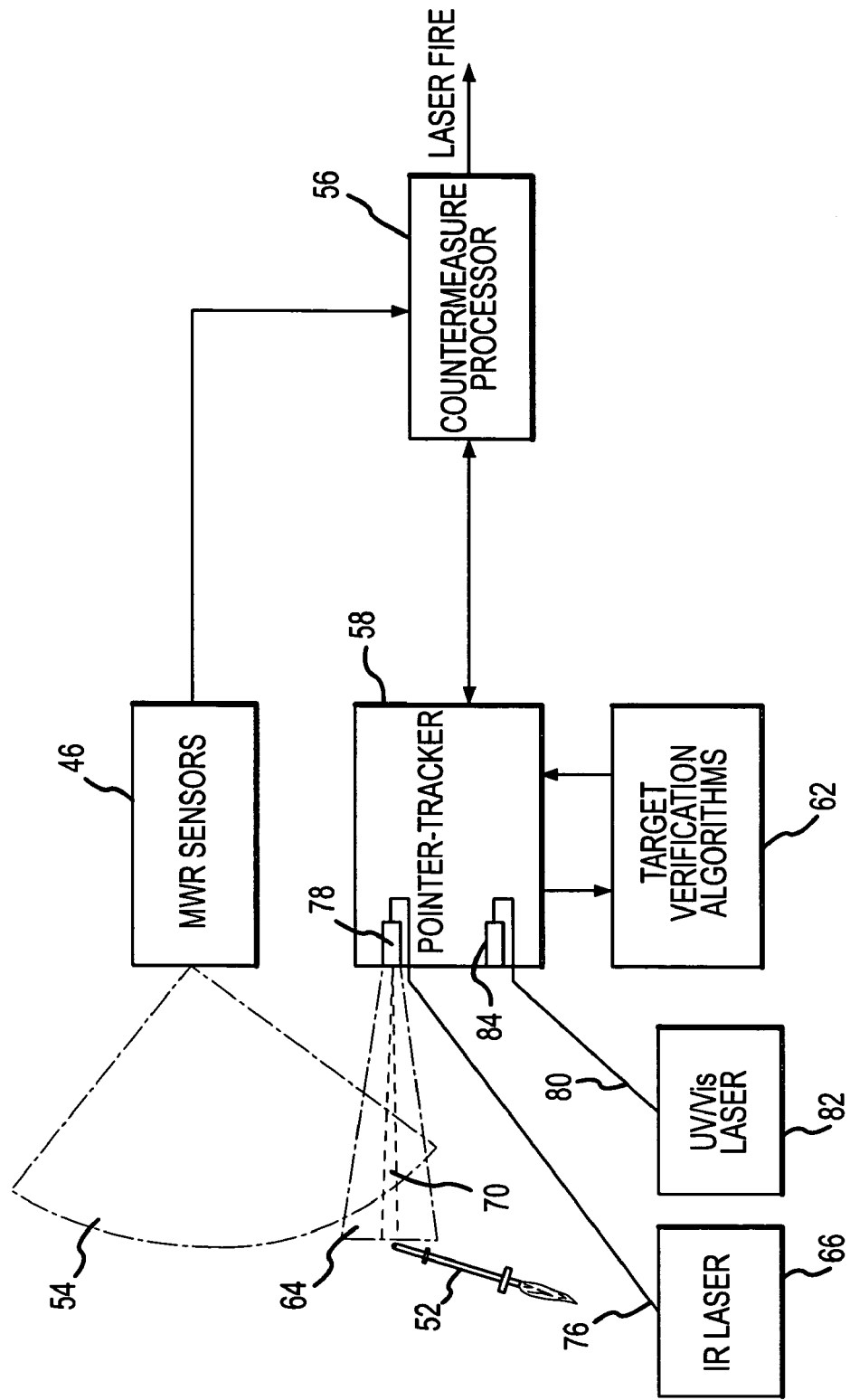
FIG. 4 is a block diagram of the steps implemented by the DIRCM system for detecting, tracking and jamming the missile in accordance with the present invention.

As shown in FIGS. 3 and 4, a DIRCM 40 is integrated in a blister package 42 and mounted towards the rear of the aircraft 44. A missile warning system (MWS) includes multiple, suitably four, one or two-color missile warning receivers (MWR) 46, a MWS power supply 48, and a missile warning processor included in the system controller 50. In a one-color system the MWRs suitably detect in the 3.5-4.8 micron band in the mid-wave infrared (MWIR). In a two-color system the MWRs suitably detect in the 3.5-3.7 and 4.24.8 micron bands in the MWIR. The MWS detects a likely missile launch 52 over a wide field-of-view (FOV) 54, identifies potential threats to the aircraft and passes the threat coordinates to a countermeasure processor 56 also included in the system controller 50.

The counter measure processor 56 passes the threat coordinates to a pointer-tracker 58 powered by power supply 60. The pointer-tracker may utilize a one-color detector but preferably uses a two-color detector to improve detection range and reduce false alarm rates. Both one and two color detectors suitably detect in the 3-5 micron band of MWIR. The pointer-tracker slews the gimbal and IR transmitter mounted thereon (See FIG. 5) to initiate tracking based on the threat coordinates. After slewing has been initiated, the pointer-tracker preferably uses target verification algorithms 62, preferably two-color, to continue tracking within a narrow FOV 64 and verify the threat. A two-color algorithm exploits the differences in spectral content and scene dynamics between a missile and background clutter to verify the target.

If the threat is verified, the pointer-tracker 58 notifies the countermeasure processor 56, which engages an IR laser 66 (powered by laser power supply 68) to fire a modulated laser beam 70 and jam the missile's IR seeker. The primary IR laser suitably operates in bands 2, 3, or 4 (e.g. the short and mid infrared bands) The blister pack also suitably includes a flight data recorder 72 that records DIRCM system data and event data including MWS video of classified threat(s) and Pointer-Tracker video of engagement and an aircraft avionics interface subsystem 74 that directs power, control and status signals to and from aircraft avionics and notifies the aircraft of an attack and the action taken.

A continuous fiber 76 is preferably used to couple the output of the laser 66 to the input of the laser transmitter 78 mounted on the gimbal. The continuous fiber path is suitably routed around the gimbal pivot and off the Roll/Nod gimbal axes. The continuous fiber path greatly reduces loss and damage associated with free-space optical interfaces, and thus greatly increases output power and reliability. By routing the fiber path around the gimbal axes, a second continuous fiber 80 can be routed along the fiber path to couple a UV/visible laser 82, suitably LV to near IR (approximately 0.28 microns to 0.7 microns), to a laser transmitter 84 mounted on the gimbal. The IR and UV/visible lasers may share a common laser transmitter. The laser transmitter(s) are preferably mounted off-axis from the Roll/Nod gimbal axes to avoid backscatter from the laser into the pointer-tracker's detector. Conformal optics is suitably used to minimize the distortion through the gimbal's spherical dome caused by the off-axis mounting.

By slewing the gimbal based on unverified threat coordinates to initiate tracking the system is highly agile and can respond to short and near simultaneous MANPADS shots. As described below, a light weight, agile pointer-tracker such as an AIM-9X Imaging Seeker may be modified for use in the DIRCM system. The AIM-9X Imaging Infrared Roll/Nod Seeker is the latest in a long line of seekers developed for the Sidewinder family of air-to-air missiles which stretches back to the mid '50s. The seeker uses imaging infrared to create an IR image of target and background. The detected infrared image is fed to the processor that determines target from background clutter and tracks the target. The processor performs the same functions when exercising the Infrared Counter-countermeasure (IRCCM) logic that isolates countermeasures from the target. Other Pointer-Trackers may be modified or designed to provide similar functionality and attributes as the AIM-9X. The AIM-9X was selected because it is available in large quantities and provides the necessary features for use in the DIRCM system. The production rate for the AIM-9X seeker can be ramped up to meet both military and commercial aviation needs as the modifications to the AIM-9X seeker converting it to a DIRCM are minimal.

Figure 5:
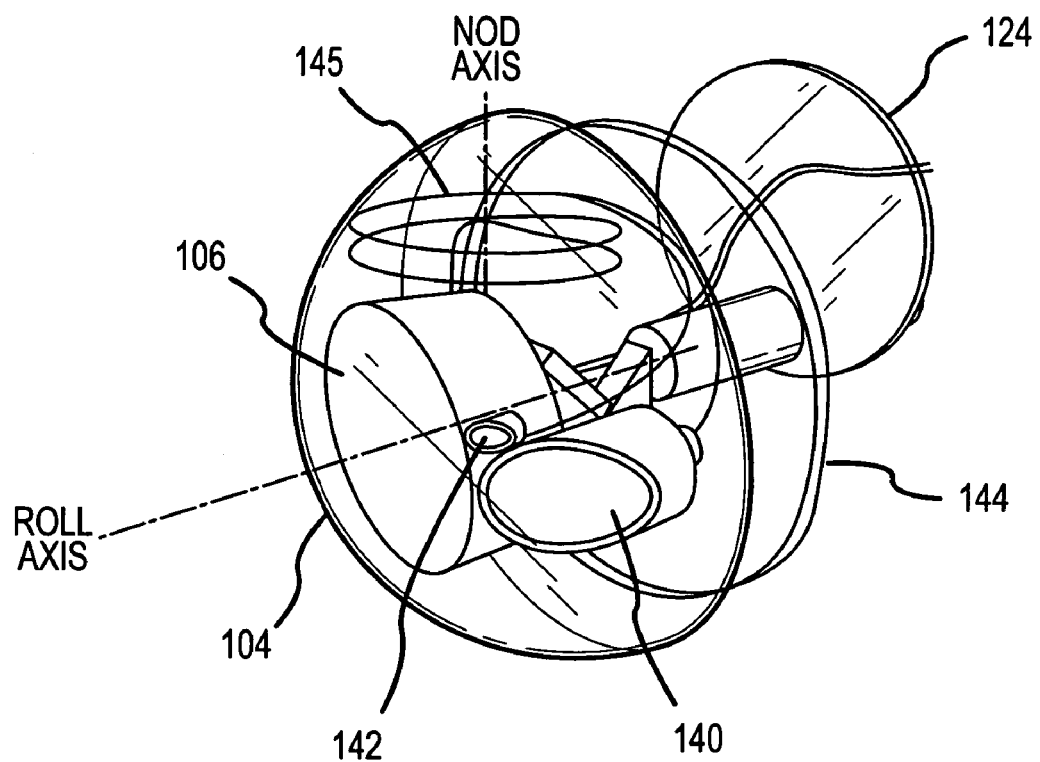
FIG. 5 is a diagram of a known AIM-9X two-color pointer tracker modified in accordance with the present invention.
Figure 6:
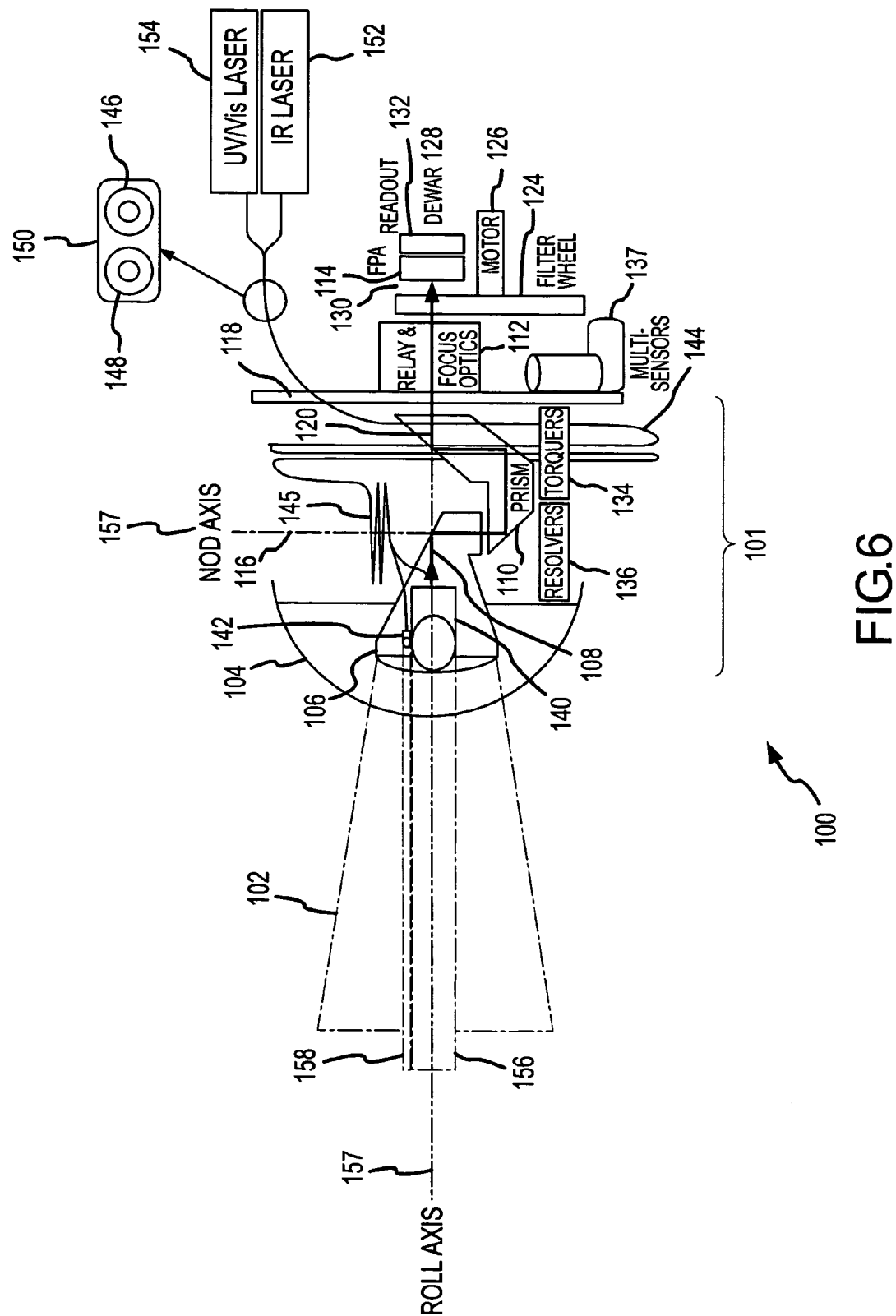
FIG. 6 is a schematic diagram of the modified AIM-9X pointer-tracker.
Figure 7:
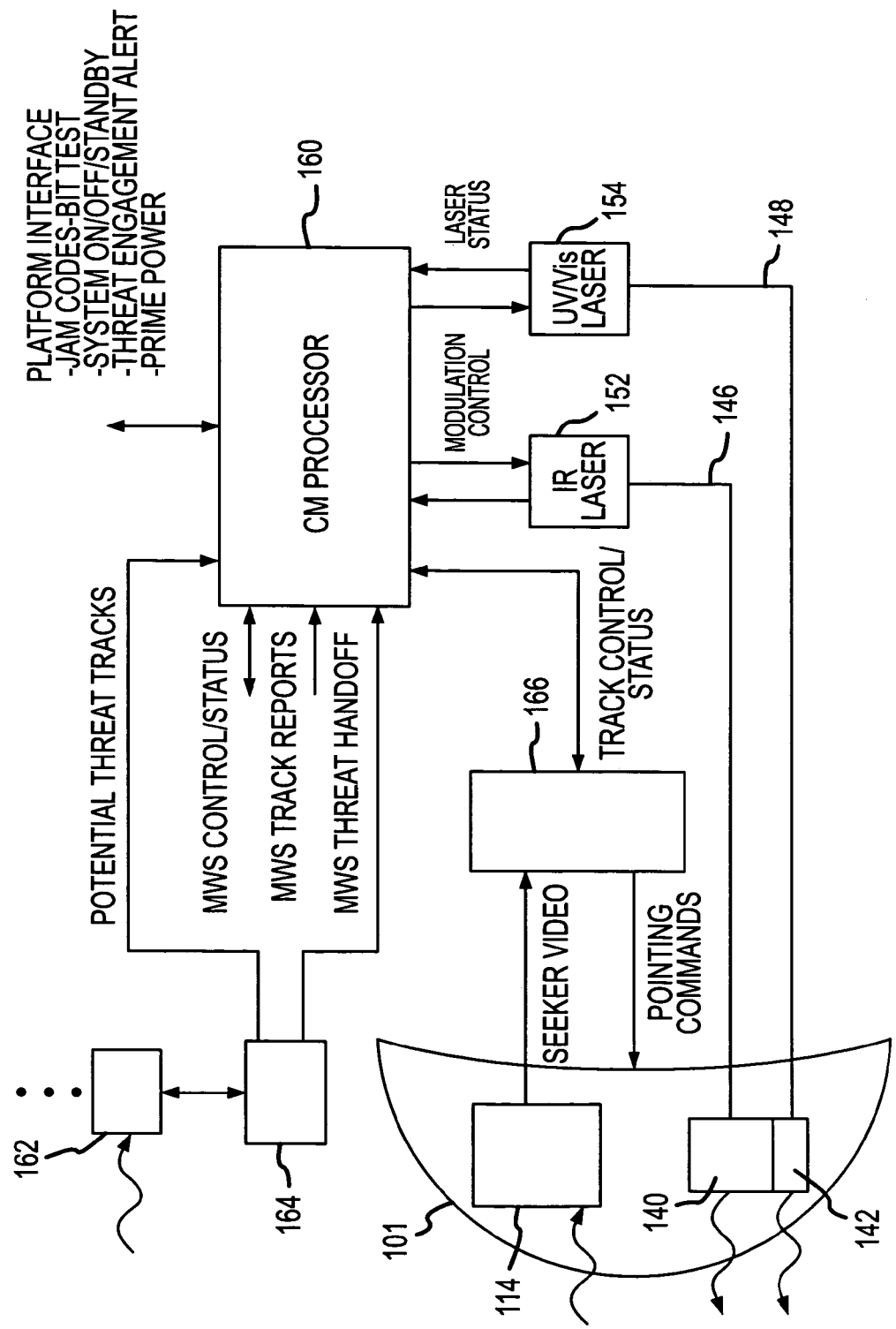
FIG. 7 is a block diagram of the operation of the AIM-9X countermeasure processor

As illustrated in FIGS. 5 through 7, an AIM-9X Imaging Seeker 100 has been modified for use in the DIRCM system 40 to detect, track, verify and jam a threat such as a shoulder launched missile. The seeker's Roll/Nod gimbal 101 includes all of the mechanical components forward of the bulkhead that articulate in the roll and nod axes. The optical components in the standard AIM-9X seeker head and the additional optical components for transmitting a jam laser beam(s) are mounted on the gimbal.

Infrared energy enters the seeker gimbal 101 over a wide FOV 102, suitably 10s of milliradians, through a dome 104. Sapphire was selected as a suitable material for the AIM-9X dome for its scratch resistance and ability to withstand aerodynamic heating experienced during flight. A folded Afocal Telescope 106 collects IR energy. The energy is collimated into a beam 108 and travels through a series of prisms 110 and relay and focus optics 112 to a Staring Focal Plane Array (FPA) 114. The prisms and optics are configured in such a way that they enable the seeker's gimbal to articulate in both roll and nod. As the energy 108 exits the folded Afocal Telescope it crosses the nod axis 116, enters the prism and is relayed to where it reaches the sealed bulkhead 118 where it crosses the roll axis 120. Beyond this point the optics and FPA detector are body fixed. Once past the gimbal's roll axis the energy 108 enters the relay and focus optics lens set 112. This set of optics forms the image on the FPA 114 located at the image plane of the focus optics. Located between the focus optics and FPA is a spinning filter wheel 124 that contains multiple filtering elements that select the spectral band in which the seeker operates. Filter selection is software driven and can change in real-time with the changing engagement by controlling motor 126. Spectrally optimized energy enters the vacuum Dewar 128 passes a cold stop 130, is imaged on, for example, a 128 by 128 Indium Antimonide staring FPA 114, and readout by readout circuit 132. The FPA is typically cooled by a Cryoengine (not shown) affording unlimited cooling during the mission.

The bulkhead 118 and fixed components of the seeker aft of the gimbal allow for high Off Boresight Angle (OBA) operation within the traditional 3 inch Sidewinder dome diameter. The Roll/Nod gimbal configuration provides superior target tracking. Off-Gimbal Inertial Seeker Assembly allows high slew rates. With the Roll/Nod gimbal the detector 114 is off-gimbal. There are no cryogenic lines that must cross the gimbals. The reduced on-gimbal mass and minimal spring torque allow the gimbal to be controlled by a high bandwidth control loop that drives the Roll/Nod torquer motors 134 enabling very high speed slewing and fast settling times for the seeker. Seeker pointing angle is measured by high precision resolvers 136. Sensors 137 measure gimbal positions and platform motion along the different axis.

The Imaging Seeker 100 is modified for use in the DIRCM 40 by outfitting it with the proper laser sources, fiber optics and laser transmitters needed to jam the seeker on the inbound missile. The Sapphire dome 104 transmits energy from the Ultraviolet through mid-infrared so the DIRCM can transmit laser energy that is in-band to the most advanced multi-color threats that operate in multiple portions of the spectrum including the Ultraviolet. Materials other than Sapphire such as Germanate and Calcium Aluminate glasses, may also provide the requisite mechanical and transmission properties. Existing and in development DIRCM systems can not operate at wavelengths from the near infrared through the visible and into the ultraviolet due to limits imposed by materials used in their optical systems. The two-color tracking algorithms used in the AIM-9X may be used without further modification.

The seeker's gimbal 101 is fitted with a multiband infrared conformal optics laser transmitter telescope 140 and, in some cases, a UV/visible conformal optics laser transmitter telescope 142, attached off-axis to and aligned with the folded Afocal telescope 106 line-of-sight. Details of the conformal optics preferably used herein are provided in copending U.S. patent application Ser. No. 10/909,940 entitled "Windowed Optical System Having A Tilted Optical Element To Correct Aberrations", filed on Dec. 4, 2002 and U.S. Pat. Nos. 6,552,318; 6,313,951; 6,310,730 and 6,028,712, which are hereby incorporated by reference. The threat missile is centered in the track frame, laying the laser transmitter's optical line of sight onto the missile. The optical centerlines of the AIM-9X Infrared tracker and the laser transmitter are co-aligned. Continuous IR fiber 146 and UV/visible fiber 148, suitably encapsulated in a flexible anti-chaffing/entanglement encapsulation 150, are used to couple the respective laser transmitters to the output of the IR laser 152 and UV/visible laser 154, respectively. The encapsulated dual-fiber 150 is routed in a roll axis dual fiber service loop 144 off the gimbal pivot 157 and looped around the roll axis 120 and then in a nod axis dual fiber service loop 145 looped around the nod axis 116. The continuous fiber path, which avoids passing the laser energy through the gimbal Roll and Nod axes, greatly reduces loss and possibility of damage associated with free-space optical interfaces, and thus greatly increases output power and reliability.

When directed to fire, the IR laser 152 fires an IR laser jam beam 156 that passes through IR fiber 146, is emitted by telescope 140 and transmitted through dome 104. The jam beam 156 is aligned with the seeker's line-of-sight on the target and has only a few milliradians of beam divergence. More sophisticated missiles can, once their IR seeker is jammed, switch to a UV/visible tracking mode. The DIRCM is simultaneously in concert with the IR laser commanding the UV/visible laser 154 to fire a UV/visible laser jam beam 158 that passes through UV/visible fiber 148, is emitted by telescope 142 and transmitted through dome 104. The jam beam 158 is aligned with the seeker's line-of-sight on the target and has only a few milliradians of beam divergence.

As modified, the Afocal telescope 106, laser transmitters 140 and 142 and fiber(s) 148 and 146 are mounted on the Nod axis 116. These in turn are attached to the relay prism 110. This entire assembly is mounted on the roll axis 120. IR energy 108 received by the Afocal telescope is transmitted off the gimbal via the prism that is on-gimbal and is firmly attached to the roll axis, into the off gimbal relay and focus optics that forms the image on the Focal Plane Array. In this configuration, the laser energy does not pass through the gimbal axes as is done in all the other systems. The use of fibers 146 and 148 decouples the transmission of the laser energy from restrictions imposed by conventional free space optics and coupling methods. The use of fibers also enables simple low-cost upgrades to be made by enabling the use of multiple fibers to add additional laser emissions to be in-band of advanced threat missiles.

As shown in FIG. 7, a countermeasure (CM) processor 160 acts as the interface to the aircraft, monitors status and controls the operation of the DIRCM, specifically the slewing of the seeker's gimbal 101 to track the target and the firing of the IR laser 152 and/or UV/visible laser 154 upon verification of the threat. At power up the CM processor looks at the BIT test reports from each subsystem. Mission specific jam codes are down loaded to the laser control algorithms in the CM Processor. The CM processor powers up the respective subsystems depending on the mode the system is in.

The Missile Warning system includes multiple MWRs 162 that look for potential threats over much of 4π Stiradian. A missile warning processor 164 processes the detected MWR images to identify possible threat tracks. Once detected, the potential threat partially developed track is passed to the CM Processor (MWS threat handoff), which passes the data onto the AIM-9X Tracker/System Interface 166 for verification of the threat.

The AIM-9X Tracker/System Interface 166 slews the modified seeker gimbal 101 to the point in space where the Missile Warning system detects a potential threat. The AIM-9X seeker using its advanced tracking algorithms in association with two color threat detection/verification algorithms verifies or eliminates the target track based on its characteristics.

If validated a threat validation message is sent to the CM Processor that then commands the two lasers to begin lasing using a default jam code or the mission specific code loaded at the time the system was powered up. Lasing of the threat missile seeker will continue until certain criteria are met as determined by the AIM-9X Tracker.

If multiple valid threats are detected and validated by AIM-9X the seeker will service the threat determined to be the highest threat then slew at high peed to the next threat. Track on the threats not being engaged by the AIM-9X is maintained and updated by the Missile Warning Subsystem. When a threat is validated and engaged and lasing takes place a Threat Engagement Alert message is sent to the platform indicating that a missile attack was detected and bearing(s) passed.

While several illustrative embodiments of the invention have been shown and described, numerous variations and alternate embodiments will occur to those skilled in the art.

Such variations and alternate embodiments are contemplated, and can be made without departing from the spirit and scope of the invention as defined in the appended claims.

I claim:

1. A directed infrared countermeasures (DIRCM) system for use on an aircraft to track and jam a missile having an infrared (IR) missile seeker, comprising:
    a pointer-tracker having a detector and a Roll/Nod gimbal that includes optics for collecting incident IR radiation and routing it to the detector and an JR laser transmitter mounted thereon;
    an JR laser optically coupled to the laser transmitter; and
    a missile warner including a receiver that detects a likely missile launch and passes the threat coordinates to the pointer-tracker,
    said pointer-tracker slewing the gimbal to the threat coordinates to initiate tracking and then processing the data from its detector to refine tracking of and verify the threat, and, if verified, engage the IR laser to emit a modulated IR laser beam through the laser transmitter to jam the IR missile seeker.

2. The DIRCM system of claim 1, wherein the missile warner includes a one-color receiver.

3. The DIRCM system of claim 1, wherein the warner receiver and pointer-tracker detector sense in the MWIR band.

4. The DIRCM system of claim 1, wherein the pointer-tracker detector is a two-color detector.

5. The DIRCM system of claim 4, wherein the pointer-tracker two-color detector detects IR radiation in two separate bands between 3 and 5 microns.

6. The DIRCM system of claim 4, wherein the two-color pointer-tracker processes the data to refine tracking and verify the threat by application of a two color algorithm that exploits the differences in spectral content and scene dynamics between a missile and background clutter.

7. The DIRCM of claim 1, further comprising a continuous optical fiber that optically couples the laser to the laser transmitter.

8. The DIRCM of claim 7, wherein the Roll/Nod gimbal slews around a roll-axis and a nod-axis to track the target, wherein the continuous optical fiber is routed from the laser, around a gimbal pivot and off the Roll and Nod axes and to the laser transmitter.

9. The DIRCM of claim 8, further comprising:
    a UV/visible laser;
    a UV/visible laser transmitter mounted on the gimbal; and
    a second continuous fiber that couples the UV/visible laser to the UV/visible laser transmitter.

10. The DIRCM of claim 9, wherein the UV/visible laser operates between 0.28 microns and 0.7 microns.

11. The DIRCM of claim 9, wherein the IR and UV/visible laser transmitters are the same said laser transmitter.

12. The DIRCM of claim 9, wherein the IR and UV/visible transmitters are mounted on a gimbal off-axis from the gimbal Roll/Nod axes, further comprising conformal optics that reduce the aberration of the off-axis lasers through the DIRCM dome.

13. The DIRCM of claim 1, wherein the Roll/Nod gimbal slews around a roll-axis and a nod-axis to track the target, said IR transmitter is mounted on the gimbal off the Roll/Nod axes.

14. The DIRCM of claim 13, wherein the gimbal includes a dome, further comprising conformal optics that reduce the aberration of the off-axis laser through the dome.

15. A directed infrared countermeasures (DIRCM) system for use on an aircraft to track and jam a missile having an infrared (IR) missile seeker, comprising:
    a pointer-tracker having a detector and a Roll/Nod gimbal that includes optics for collecting incident IR radiation and routing it to the detector and an IR laser transmitter mounted thereon;
    an IR laser;
    a continuous optical fiber that is routed around the Roll/Nod gimbal axes to optically couple the IR laser to the laser transmitter; and
    a missile warner including multiple receivers that detects a missile launch and passes the threat coordinates to the pointer-tracker,
    said pointer-tracker slews the gimbal to the threat coordinates, processes the data from its detector to perform fine tracking and engages the IR laser to emit a modulated IR laser beam through the laser transmitter to jam the IR missile seeker.

16. The DIRCM of claim 15, wherein the missile warner passes threat coordinates of a likely but unverified missile launch, said pointer-tracker slews the gimbal to the threat coordinates to initiate tracking and further processes the data from its detector to verify the threat before engaging the IR laser.

17. The DIRCM of claim 16, wherein the pointer-tracker detector is a two-color tracker.

18. The DIRCM of claim 15, further comprising:
    a UV/visible laser;
    a UV/visible laser transmitter mounted on the gimbal; and
    a second continuous fiber that is routed around the Roll/Nod gimbal axes to couple the UV/visible laser to the UV/visible laser transmitter.

19. A method of directed infrared countermeasures (DIRCM) for using a pointer-tracker having a Roll/Nod gimbal mounted on an aircraft to track and jam a missile having an infrared (IR) missile seeker, comprising:
    Collecting incident IR radiation in a wide FOV;
    Declaring likely missile launch based on the collected IR radiation;
    Passing threat coordinates for the missile launch to the pointer-tracker;
    Slewing the Roll/Nod gimbal to the threat coordinates to initiate tracking;
    Collecting incident IR radiation in a narrow FOV through the gimbal to refine tracking of and verify the threat;
    Modulating an IR laser beam; and
    If verified, emitting the modulated IR laser beam to jam the IR missile seeker.

20. The method of claim 19, further comprising:
    transmitting the IR laser beam through a continuous fiber that is routed around the Roll/Nod gimbal axes to a gimbal transmitter.

21. The method of claim 20, further comprising:
    transmitting a UV/visible modulated laser beam through a second continuous fiber that is routed around the Roll/Nod gimbal axes to a gimbal transmitter.

22. The method of claim 19, wherein the IR radiation collected in the narrow FOV is detected in two colors and verified using two-color algorithms.

* * * * *

UNITED STATES PATENT AND TRADEMARK OFFICE
CERTIFICATE OF CORRECTION

| | | |
|---|---|---|
| PATENT NO. | : 7,378,626 B2 | Page 1 of 1 |
| APPLICATION NO. | : 11/242967 | |
| DATED | : May 27, 2008 | |
| INVENTOR(S) | : Fetterly | |

It is certified that error appears in the above-identified patent and that said Letters Patent is hereby corrected as shown below:

In column 2, line 9, delete "post" and replace with --pose--;
In column 9, line 11, claim 1, delete "JR" and replace with --IR--;
In column 9, line 13, claim 1, delete "JR" and replace with --IR--;

Signed and Sealed this

Ninth Day of September, 2008

JON W. DUDAS
*Director of the United States Patent and Trademark Office*